(12) United States Patent
Ammar

(10) Patent No.: US 10,775,529 B2
(45) Date of Patent: Sep. 15, 2020

(54) MILLIMETER WAVE IMAGING DEVICES, AND METHODS OF OPERATING MILLIMETER WAVE IMAGING DEVICES

(71) Applicant: Vu Systems, LLC, Morrisville, NC (US)

(72) Inventor: Dan Ammar, Orlando, FL (US)

(73) Assignee: VU SYSTEMS, LLC, Morrisville, NC (US)

( * ) Notice: Subject to any disclaimer, the term of this patent is extended or adjusted under 35 U.S.C. 154(b) by 481 days.

(21) Appl. No.: 15/847,378

(22) Filed: Dec. 19, 2017

(65) Prior Publication Data
US 2018/0246251 A1 Aug. 30, 2018

Related U.S. Application Data

(60) Provisional application No. 62/464,737, filed on Feb. 28, 2017.

(51) Int. Cl.
*G01V 8/00* (2006.01)
*G01V 13/00* (2006.01)
(Continued)

(52) U.S. Cl.
CPC ............ *G01V 8/005* (2013.01); *G01S 7/03* (2013.01); *G01S 13/89* (2013.01); *G01V 13/00* (2013.01);
(Continued)

(58) Field of Classification Search
CPC .......... G01N 22/00; G01S 13/89; G01S 7/03; G01V 13/00; G01V 8/005; H01Q 15/02;
(Continued)

(56) References Cited

U.S. PATENT DOCUMENTS 5,760,397 A * 6/1998 Huguenin .............. H01Q 19/06
250/332
6,441,368 B1 8/2002 Grinberg et al.
(Continued)

FOREIGN PATENT DOCUMENTS

CA 1329659 C 5/1994

OTHER PUBLICATIONS

Notification of Transmittal of the International Search Report and the Written Opinion of the International Searching Authority, or the Declaration, in corresponding PCT Application No. PCT/US2018/019646 (9 pages) (dated May 24, 2018).
(Continued)

*Primary Examiner* — Marcus H Taningco
(74) *Attorney, Agent, or Firm* — Myers Bigel, P.A.

(57) ABSTRACT

Millimeter wave imaging devices are provided. A millimeter wave imaging device includes a housing and one or more heating elements inside the housing. The millimeter wave imaging device includes a flexible gasket on the housing. The millimeter wave imaging device includes a main lens attached to the housing by the flexible gasket. The millimeter wave imaging device includes a protective lens on an outer surface of the main lens. Moreover, the millimeter wave imaging device includes an Electromagnetic Impulse (EMI) filter attached to the housing and extending along an inner surface of the main lens. Methods of operating millimeter wave imaging devices are also provided.

23 Claims, 15 Drawing Sheets

(51) Int. Cl.
*H01Q 15/24* (2006.01)
*H01Q 15/02* (2006.01)
*H01Q 19/06* (2006.01)
*G01S 7/03* (2006.01)
*H01Q 3/18* (2006.01)
*H01Q 3/20* (2006.01)
*H01Q 19/185* (2006.01)
*G01S 13/89* (2006.01)
*H01Q 1/28* (2006.01)
*H01Q 1/42* (2006.01)
*G01N 22/00* (2006.01)
*H01Q 1/02* (2006.01)

(52) U.S. Cl.
CPC ............... *H01Q 1/281* (2013.01); *H01Q 3/18* (2013.01); *H01Q 3/20* (2013.01); *H01Q 15/02* (2013.01); *H01Q 15/24* (2013.01); *H01Q 15/248* (2013.01); *H01Q 19/062* (2013.01); *H01Q 19/185* (2013.01); *G01N 22/00* (2013.01); *H01Q 1/02* (2013.01); *H01Q 1/42* (2013.01); *H01Q 1/422* (2013.01)

(58) Field of Classification Search
CPC .... H01Q 15/24; H01Q 15/248; H01Q 19/062; H01Q 19/185; H01Q 1/02; H01Q 1/281; H01Q 1/42; H01Q 1/422; H01Q 3/18; H01Q 3/20
See application file for complete search history.

(56) References Cited

U.S. PATENT DOCUMENTS

| | | |
|---|---|---|
| 6,563,462 B1 | 5/2003 | Moffa et al. |
| 6,674,392 B1 | 1/2004 | Schmidt et al. |
| 8,077,480 B2 * | 12/2011 | Ophoven ............. H04N 5/2252 361/818 |
| 9,641,772 B2 | 5/2017 | Yujiri |
| 9,832,401 B1 | 11/2017 | Donovan, Jr. et al. |
| 9,869,583 B1 | 1/2018 | Yujiri et al. |
| 2005/0135724 A1 | 6/2005 | Helvajian et al. |
| 2006/0273255 A1 * | 12/2006 | Volkov ................... G01S 7/024 250/336.1 |
| 2007/0001895 A1 | 1/2007 | Kolinko et al. |
| 2009/0015491 A1 | 1/2009 | Ikeda et al. |
| 2010/0214150 A1 | 8/2010 | Lovberg et al. |
| 2011/0073772 A1 | 3/2011 | Schuetz et al. |
| 2011/0260905 A1 * | 10/2011 | Uemura ................ G01V 8/005 342/22 |
| 2015/0185592 A1 | 7/2015 | Eineren et al. |

OTHER PUBLICATIONS

Communication with Supplementary European Search Report, EP Application No. 18761275.9, dated Jun. 25, 2020, 11 pp.
Yujiri et al., "Passive millimeter-wave camera", Proceedings of SPIE, vol. 3064, Jun. 27, 1997, pp. 15-22.
Examination Report, CA Application No. 3,046,248, dated Jul. 16, 2020, 6 pp.

* cited by examiner

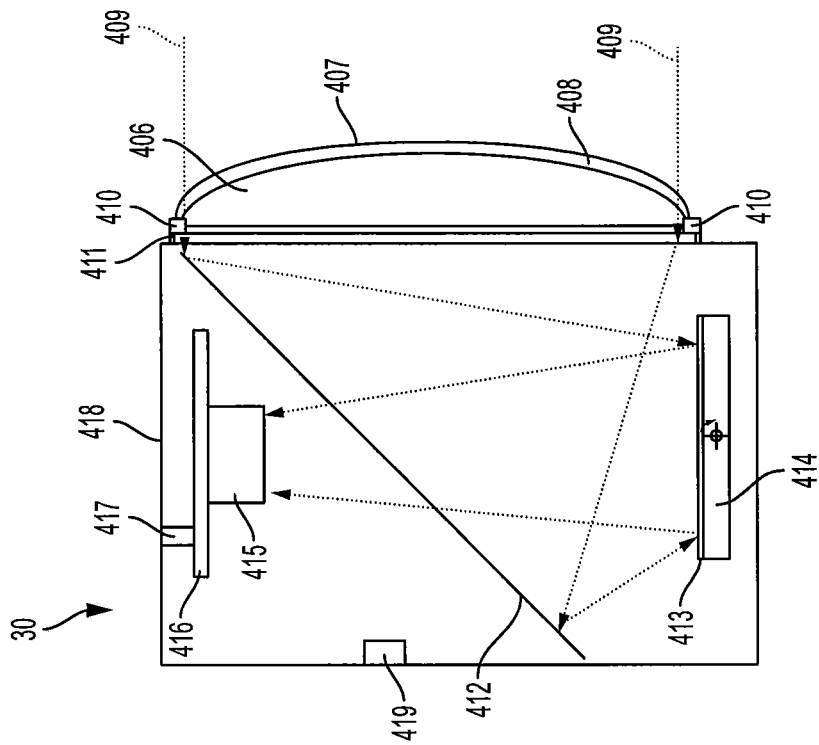
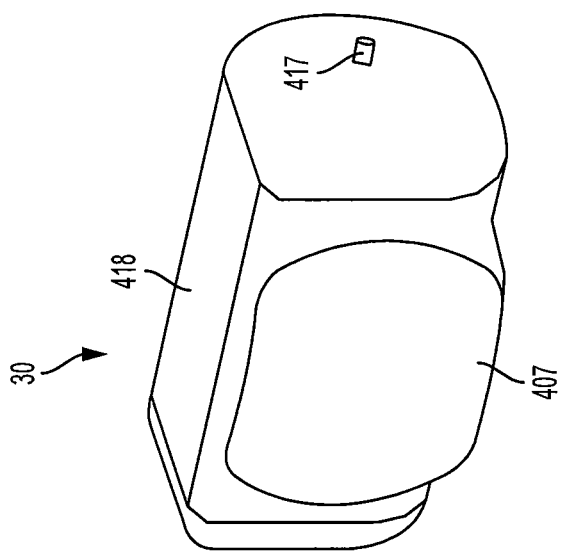
FIG. 4B
FIG. 4A

ND METHODS OF OPERATING
MILLIMETER WAVE IMAGING DEVICES, AND METHODS OF OPERATING MILLIMETER WAVE IMAGING DEVICES

CLAIM OF PRIORITY

The present application claims the benefit of U.S. Provisional Patent Application Ser. No. 62/464,737, filed Feb. 28, 2017, the disclosure of which is hereby incorporated herein in its entirety by reference.

FIELD

The present disclosure relates to millimeter wave imaging devices.

BACKGROUND

A millimeter wave radiometric sensor is a device that detects electromagnetic energy that has noise-like characteristics. A millimeter wave imaging device typically includes an antenna or a lens, one or more receivers, an image-formation processor, and a display. A radiometric sensor is frequently referred to as a temperature-measuring device. This temperature concept is useful in describing the functions of the sensor. The lens or antenna extracts noise power from the radiation incident on its aperture and presents that noise power to the receiver. The prime function of the receiver is to amplify and detect the input signal. All processes of receiver amplification add noise to the received signal. This added noise is frequently referred to as the internal receiver noise. The unwanted noise power generated by the receiver cannot be differentiated from the desired signal temperature of the target. Moreover, harsh weather conditions (e.g., low temperatures), such as those experienced when performing imaging via an aircraft while in the air, may further challenge the imaging process by stressing the imaging device.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the invention.

According to some embodiments of the present invention, a millimeter wave imaging device may include a housing and one or more heating elements inside the housing. The millimeter wave imaging device may include a flexible gasket on the housing. The millimeter wave imaging device may include a main lens attached to the housing by the flexible gasket. The millimeter wave imaging device may include a protective lens on an outer surface of the main lens. Moreover, the millimeter wave imaging device may include an Electromagnetic Impulse (EMI) filter attached to the housing and extending along an inner surface of the main lens. The EMI filter may be configured to pass millimeter wave frequencies of Radiofrequency (RF) energy collected by the main lens while rejecting signals with frequencies that are lower than the millimeter wave frequencies.

In some embodiments, the housing may be a main outer housing of the millimeter wave imaging device. Moreover, the protective lens may be attached to the main outer housing by the flexible gasket.

According to some embodiments, the protective lens may be spaced apart from the outer surface of the main lens by an air gap. Additionally or alternatively, the flexible gasket may be an elastomeric gasket that attaches the main lens and the protective lens to the housing.

In some embodiments, the main lens may be thicker than the protective lens. Additionally or alternatively, the millimeter wave imaging device may include a motorized scanner, and a polarization rotator on the motorized scanner. Moreover, the millimeter wave imaging device may include a polarization splitter configured to reflect, to the polarization rotator, millimeter wave energy of the RF energy collected by the main lens. The RF energy polarization may then be rotated 90 degrees by the polarization rotator and may pass through the polarization splitter to be collected by a Focal Plane Array (FPA).

According to some embodiments, the millimeter wave imaging device may include an FPA that is configured to receive the millimeter wave frequencies that are collected by the main lens. For example, the FPA may be configured to receive, from the polarization rotator, energy of the millimeter wave frequencies that includes a rotated polarization.

In some embodiments, the FPA may include an array of pixels, and one or more temperature regulators coupled to the array of pixels. For example, the one or more temperature regulators may be one or more Thermoelectric Cooler (TEC) modules configured to cool and/or heat the FPA. Moreover, the FPA may include a flexible material adjacent the array of pixels, a metal heat spreader on the flexible material, and an insulation layer on the flexible material and/or on the metal heat spreader.

In some embodiments, the millimeter wave imaging device may include a sensor calibration target on the array of pixels. The sensor calibration target may include a shutter, and the millimeter wave imaging device may include an actuator that is configured to slide the shutter to selectively expose or cover pixels among the array of pixels.

According to some embodiments, the millimeter wave imaging device may include a metal spacer between adjacent rows of pixels in the array of pixels. Additionally or alternatively, each of the one or more heating elements may be configured to automatically power-on in response to detecting that an ambient temperature inside the millimeter wave imaging device is below a threshold temperature. Moreover, camera functionality of the millimeter wave imaging device may be configured to automatically power-on in response to deployment of landing gear of an aircraft including the millimeter wave imaging device.

A millimeter wave camera, according to some embodiments, may include an outer housing, and one or more heating elements inside the outer housing. The millimeter wave camera may include a flexible gasket on the outer housing, and a main lens attached to the outer housing by the flexible gasket. Moreover, the millimeter wave camera may include a protective lens overlapping an outer surface of the main lens and attached to the outer housing by the flexible gasket. The millimeter wave camera may include an Electromagnetic Impulse (EMI) filter extending along an inner surface of the main lens, and the EMI filter may be configured to pass millimeter wave frequencies of RF energy collected by the main lens. The millimeter wave camera may include a motorized scanner, a polarization rotator on the motorized scanner, and a polarization splitter configured to reflect, to the polarization rotator, the millimeter wave frequencies that are collected by the main lens. Moreover, the millimeter wave camera may include an FPA configured to receive, from the polarization rotator, energy of the millimeter wave frequencies that include a rotated polarization.

In some embodiments, the FPA may include a temperature regulator that is configured to cool and/or heat the FPA. Moreover, the protective lens may be spaced apart from the outer surface of the main lens by an air gap.

A millimeter wave camera, according to some embodiments, may include an outer housing, one or more heating elements inside the outer housing, and a flexible gasket on the outer housing. The millimeter wave camera may include a main lens attached to the outer housing by the flexible gasket. The millimeter wave camera may include a protective lens attached to the outer housing by the flexible gasket and spaced apart from an outer surface of the main lens by an air gap. The millimeter wave camera may include an EMI filter extending along an inner surface of the main lens. The EMI filter may be configured to pass millimeter wave frequencies of RF energy collected by the main lens. The millimeter wave camera may include a polarization rotator, and a polarization splitter configured to reflect, to the polarization rotator, the millimeter wave frequencies that are collected by the main lens. Moreover, the millimeter wave camera may include an FPA configured to receive, from the polarization rotator, energy of the millimeter wave frequencies that includes a rotated polarization. The FPA may include an array of pixels, and a temperature regulator coupled to the array of pixels.

In some embodiments, each of the one or more heating elements may be configured to automatically power-on in response to an ambient temperature inside the outer housing that is below a threshold temperature. Moreover, camera functionality of the millimeter wave camera may be configured to automatically power-on in response to deployment of landing gear of the aircraft.

According to some embodiments, the FPA may include a flexible material adjacent the array of pixels. The FPA may include a metal heat spreader on the flexible material. Moreover, the FPA may include an insulation layer on the flexible material and/or on the metal heat spreader. The millimeter wave camera may include a shutter on the array of pixels, and the shutter may be configured to slide to selectively expose or cover pixels among the array of pixels.

A method of operating a millimeter wave imaging device, according to some embodiments, may include automatically powering-on one or more heating elements inside an outer housing of the millimeter wave imaging device, in response to an ambient temperature inside the outer housing that is below a threshold temperature. The method may include sliding a shutter that is on an FPA inside the outer housing, to selectively expose or cover a group or pixels that is among an array of pixels of the FPA. The method may include receiving RF energy at the millimeter wave imaging device via components of the millimeter wave imaging device including: a main lens attached to the outer housing by a flexible gasket; a protective lens attached to the outer housing by the flexible gasket; and an EMI filter extending along an inner surface of the main lens. Moreover, the method may include producing an image based on the RF energy.

In some embodiments, the method may include automatically powering-on camera functionality of the millimeter wave imaging device, in response to deployment of landing gear of an aircraft that includes the millimeter wave imaging device. Additionally or alternatively, the method may include operating one or more TEC modules inside the millimeter wave imaging device at a first set point based on the ambient temperature. Moreover, the method may include adjusting the first set point to a second set point of the one or more TEC modules, in response to detecting a change in the ambient temperature.

This invention is directed to a high-performance, reduced-footprint PMMW imaging device that can be used in harsh environmental and EMI conditions. It is therefore an object of the present invention to provide a compact PMMW sensor that overcomes the disadvantages of prior art passive radiometer imaging devices.

One aspect of this invention is predicated on the concept of providing a simple, compact PMMW imaging device that can operate in harsh environmental and EMI conditions such as those found in the radome of an aircraft. In some embodiments, the PMMW imaging device includes an outer housing, a thin protective lens, a main lens, an EMI filter, a polarization splitter, a polarization rotator, a highly temperature stabilized FPA, a processor board that digitizes the RF detected signals and produces an image of the target.

In accordance with one aspect of the present invention, various techniques are used to overcome the challenges of operating the PMMW imaging device over a very wide temperature range. The PMMW imaging device uses a thin insulating lens with a small air gap to provide insulation for the main lens, incorporates a flexible elastomeric mounting gasket to attach the main lens to the housing, and employs a heating element inside the sensor to reduce the temperature range inside the sensor.

In one aspect of the present invention, the FPA includes an intricate housing, heat spreading, insulation, and active cooling and heating TEC modules that can maintain a stable receiver pixel temperature within +/−0.1 degrees.

In yet another aspect of the present invention, a calibration target is integrated into a shutter system that includes a sliding plate, and an actuator that slides over pixel openings to create a stable calibration target that can be used to align the pixels relative to each other.

The present invention advantageously overcomes the prior art drawbacks and provides a compact PMMW imaging device that can be used in small, environmentally and EMI hostile conditions such as those found in the nose of an aircraft.

BRIEF DESCRIPTION OF THE DRAWINGS

Other objects, features, and advantages of the present invention will become apparent from the detailed description that follows, when considered in light of the accompanying drawings in which:

FIGS. 4A and 4B illustrate a perspective view and a top view, respectively, of a PMMW imaging device according to the present invention. Moreover.

DETAILED DESCRIPTION

The present invention will now be described more fully hereinafter with reference to the accompanying drawings, in which example embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

A PMMW imaging device herein may be used, for example, in an aircraft enhanced- vision system to image a runway in fog (or clouds or smoke), for people-screening for concealed weapons, or for see-through-the-wall applications. For example, a PMMW imaging device according to the present invention may provide a compact MMW sensor that fits in small spaces such as an aircraft radome and that employs a novel design that allows automatic calibration and operation over a wide range of temperatures.

Figure 1:
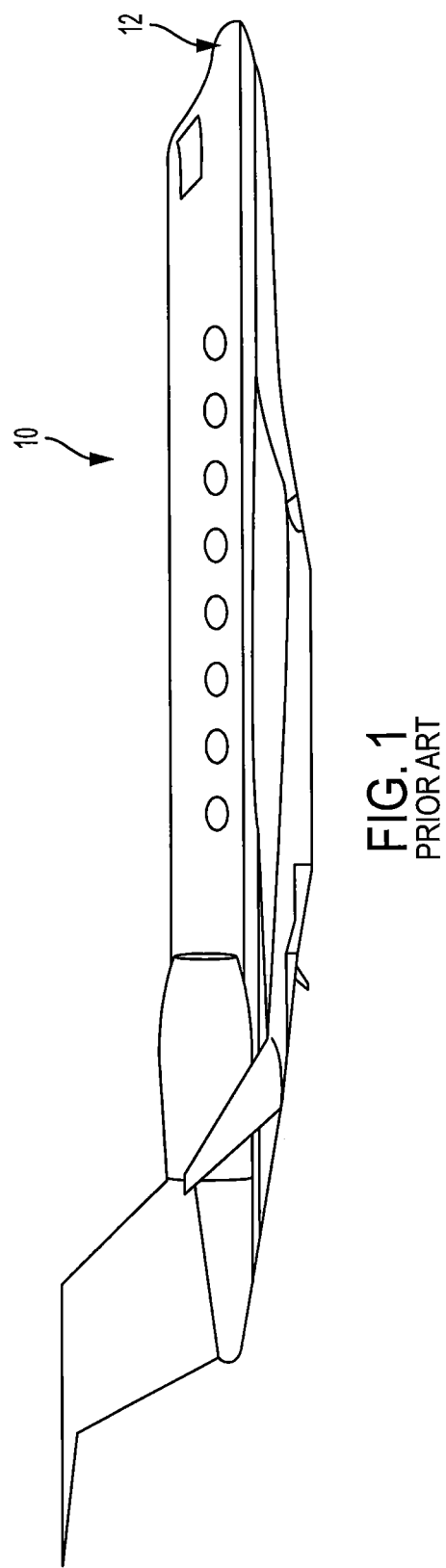
FIG. 1 is an illustration of an aircraft with a conventional nose radome.
Figure 2:
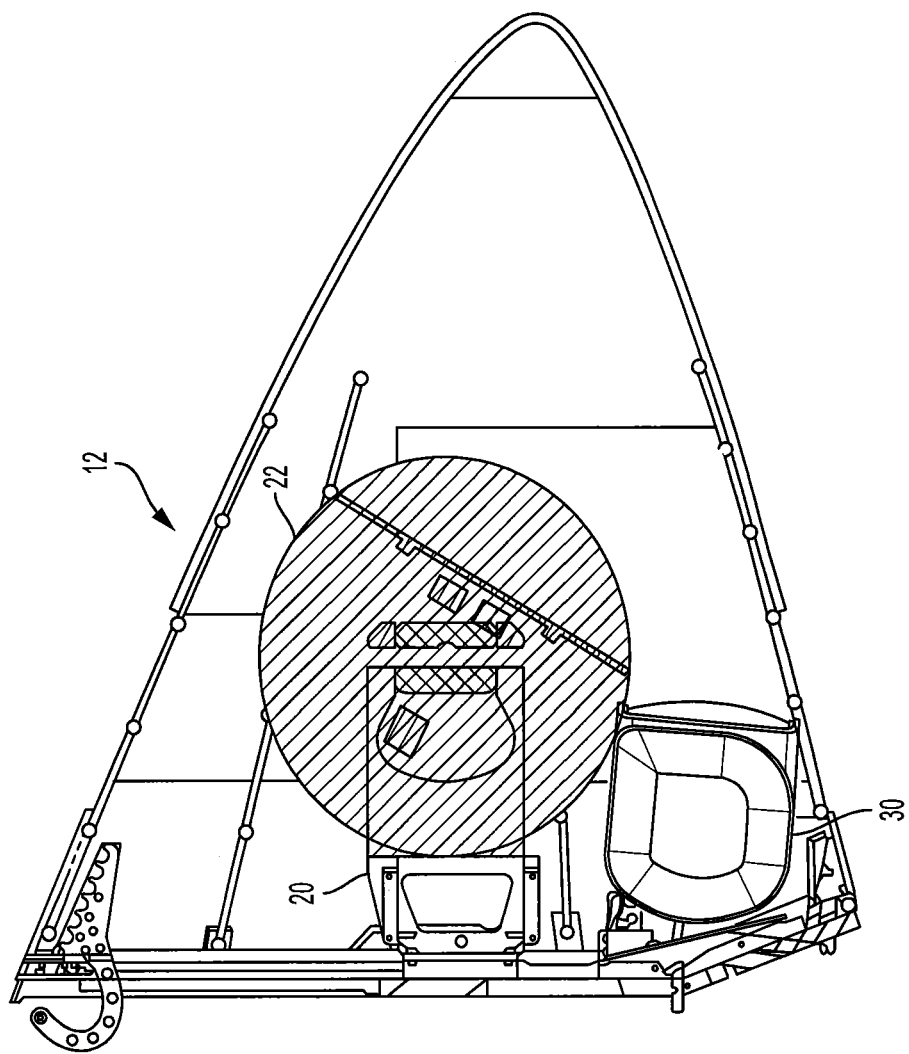
FIG. 2 is a cross-sectional view of a nose radome for an aircraft, illustrating the location therewithin of a radar sensor and antenna, and a PMMW imaging device according to some embodiments of the present invention.

FIG. 1 illustrates an aircraft 10 having a nose radome 12 mounted to a bulkhead of the aircraft 10. Referring to FIG. 2, a nose radome 12 for an aircraft 10 is illustrated enclosing a radar imaging device 20 and antenna 22, and a PMMW imaging device 30, according to the present invention. The radome 12 may have a curved body that is configured to be attached to the aircraft 10. The radome body 12 may be constructed such that it is transparent to X-band microwave energy (i.e., microwave energy in a frequency range from about 8.0 GHz to about 12.6 GHz) emitted by the radar imaging device 20. The radar imaging device 20 typically scans its antenna 22 to maintain a small incident angle relative to the radome surface.

A portion of the body of the radome body 12 may be constructed such that it is transparent to W-band microwave energy (i.e., microwave energy in a frequency range from about 75 GHz to about 110 GHz) emitted by the PMMW imaging device 30. In FIG. 2, the PMMW imaging device 30 is mounted below the radar imaging device 20 and may have a fixed antenna. Because the PMMW imaging device 30 may be positioned beneath the radar imaging device 20 and is angled downwardly (e.g., about five degrees (5°), the bore sight of the PMMW imaging device 30 may make an angle relative to the radome 12 of approximately sixty five degrees (65°).

Figure 3B:
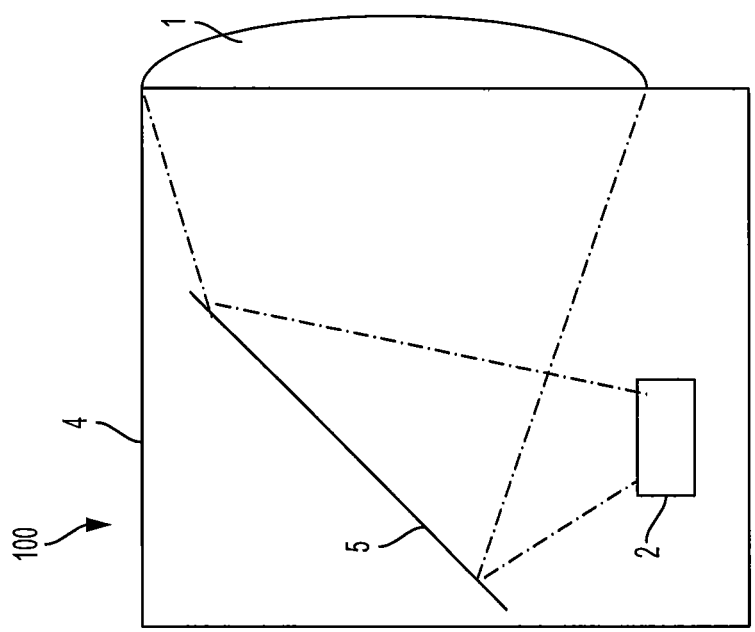
FIGS. 3A and 3B are diagrams of a prior art PMMW imaging device.
Figure 3A:
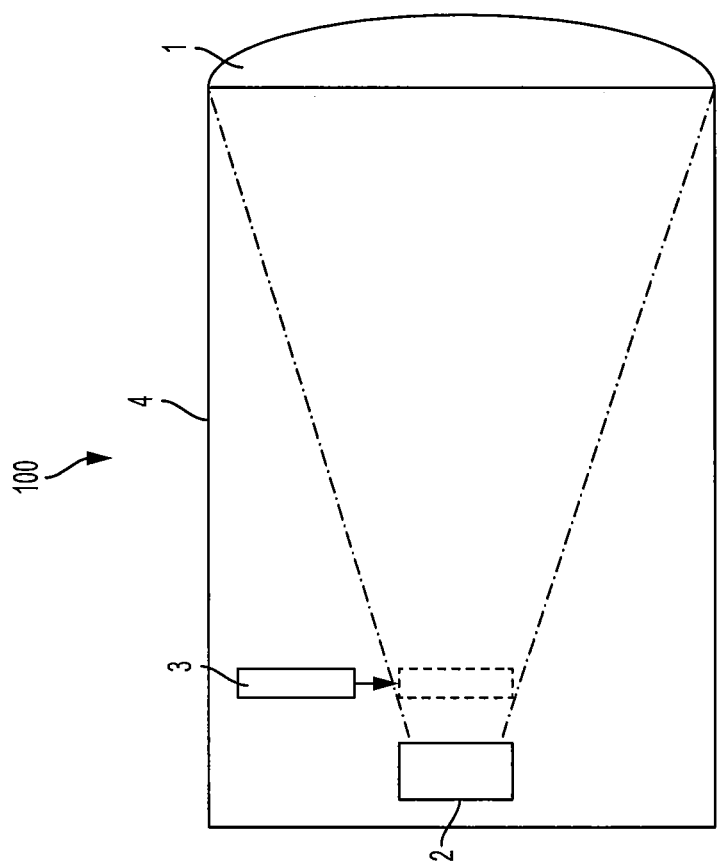

FIGS. 3A and 3B illustrate a prior-art PMMW imaging device 100 with refractive optics. The device 100 typically consists of a main lens 1, a secondary reflector 5, a focal plane array 2, a calibration mechanism, and a housing 4. The lens 1 focuses energy on the focal plane array 2, which is made up of one or more sensing pixels. A calibration target 3 is typically moved in front of the focal plane array 2, during calibration, using some type of a mechanical mechanism (not shown). The calibration target 3 is usually included as an integral part of the imaging device 100 and is referred to as the "calibration internal noise source." The housing 4 is used for mounting all the items and providing protection from the outside environment. Of course, there are many different variations of this design, including adding a secondary reflector 5 to direct the energy to a different location within the housing 4 where the focal plane array 2 can be located, as shown in FIG. 3B. The main purpose of the secondary reflector 5 is to reduce the size of the housing 4.

The need for signal amplification in an imaging device becomes readily apparent when one notes that the average noise power per unit bandwidth produced by a resistor at an ambient temperature (290K) is of the order of $10^{-20}$ Watt. Typical detectors require a drive power of about $3\times10^{-6}$ W. The receiver of an imaging device must therefore be able to sense a low-level change in noise power at its input and provide sufficiently stable amplification to create good images. Amplification stability is a prime requisite because the receiver must provide a consistent output response for the same input power change.

In most radiometric applications, the magnitude of the signal temperature is negligible when compared with the "receiver" noise temperature. The sensitivity of a radiometric system, i.e., the minimum detectable signal, is determined by the amplitude of the fluctuations in the absence of a signal. The relatively poor gain stability of imaging devices may make it difficult to achieve high sensitivity.

PMMW imaging devices have been designed and built for decades. The most common method used is a large reflector or lens collecting RF signals and reflecting them directly, or through a second reflector, to one or more receivers. Because of the relatively long wavelength of MMW frequencies (as compared to visible light), the imaging devices tend to be large in size, require extensive manual calibration, have low sensitivity in the order of 1 degrees K, and operate mostly in a benign environmental and EMI environment.

The PMMW imaging device 30 of the present invention may address all the key challenges encountered in conventional passive imaging devices. The device 30 incorporates a novel optics design that reduces the size of the PMMW imaging device 30 by at least a factor of 2. The PMMW imaging device 30 of the present invention is compact, self-calibrating, has a 0.25 degrees K sensitivity, and is configured to operate in a harsh environmental and EMI environment. The PMMW imaging device 30 may include simply a protective lens 407 (FIG. 4B), a main lens 406 (FIG. 4B), an EMI filter 411 (FIG. 4B), a polarization splitter 412 (FIG. 4B), a scanning reflector 414 (FIG. 4B) with a polarization rotator 413 (FIG. 4B), a focal plane array 415 (FIG. 4B) with a number of pixels 622 (FIG. 6) and a built-in calibration mechanism, a digital image processor 416 (FIG. 4B), and a housing 418 (FIG. 4B).

FIGS. 4A and 4B illustrate a perspective view and a top view, respectively, of a PMMW imaging device 30 according to the present invention. The design of the PMMW imaging device 30 enables it to be used in small, environmentally-challenged and EMI-challenged areas such as those found in the radome area 12 of an aircraft 10. The PMMW imaging device 30 includes a main lens 406, which is protected from the outside environment by an outer lens 407. For thermal insulation, an air gap 408 may be provided between the main lens 406 and the protective lens 407. It will be understood, however, that various gases, in addition to or as an alternative to air, could be in a gap by which the main lens 406 and the protective lens 407 are spaced apart. The main lens 406 and the protective lens 407 are mounted (or otherwise attached) to the main housing 418 with one or more flexible elastomeric gaskets 410 (e.g., gaskets 410 attached to right and left sides, respectively, of an interior surface of the housing 418). The main housing 418 may be, for example, a metal housing. As used herein, the term "main" may refer to a primary lens or a primary housing.

RF energy 409 that is collected by the main lens 406 passes through an EMI filter 411, which passes the MMW frequencies of interest without any/significant losses and rejects all/most lower-frequency interfering signals with a high level of attenuation. The filtered portion of the RF energy 409 is then reflected by a polarization splitter (or "beam splitter") 412. This allows one polarization to be reflected and the second to go through. The polarization of the reflected energy from the beam splitter 412 is then rotated by 90 degrees by the polarization rotator 413, which is mounted on a motorized scanner 414. The scanner 414 is used to collect energy over a wide area of field of view.

The polarization rotation performed by the polarization rotator 413 allows the rotated polarization energy (of millimeter wave frequencies) to go through the beam splitter 412 and be collected by an FPA 415. One or more heating elements 419 may also be inside the housing 418. The temperature-controlled FPA 415 is mounted on a digital signal processor 416, which is used to digitize the signals, perform necessary calibrations, and create digitally-enhanced images. The processed image data is sent to a display (not shown) via connector 417. The imaging device 30's housing 418 is used to mount all the elements and provide protection from the outside environment.

As discussed herein, the imaging device 30 may, in some embodiments, be used in a nose radome 12 of an aircraft 10. Accordingly, the imaging device 30 may have a relatively small and lightweight design that facilitates use in the nose radome 12. For example, the imaging device 30 may weigh between twenty (20) and thirty (30) pounds. As an example, the imaging device 30 may weigh about twenty-six (26) pounds. It may be undesirable to have a heavier weight than this range in the nose radome 12.

Moreover, the imaging device 30 may extend between six (6) and thirty-six (36) inches in each direction. For example, the imaging device 30 may extend about 17.9 inches in the vertical direction that is illustrated in FIG. 4B, about 11.8 inches in the lateral direction that is illustrated in FIG. 4B, and about 9.7 inches in the vertical direction that is illustrated in FIG. 4A. Accordingly, the longest length/dimension of the imaging device 30 may be in the vertical direction that is illustrated in FIG. 4B. This shape and size of the imaging device 30 may facilitate use in the limited area of the nose radome 12.

Furthermore, the EMI filter 411 may have a thickness, in the lateral direction that is illustrated in FIG. 4B, between one (1) and three (3) millimeters (mm). As an example, the EMI filter 411 may be about two (2) mm thick. Additionally or alternatively, the top surface of the FPA 415 (e.g., the top surface illustrated in FIG. 6) may have a surface area between twenty (20) and forty (40) square inches. For example, the top surface of the FPA 415 may have dimensions of about 4.5 inches by about 5.7 inches.

Figure 4C:
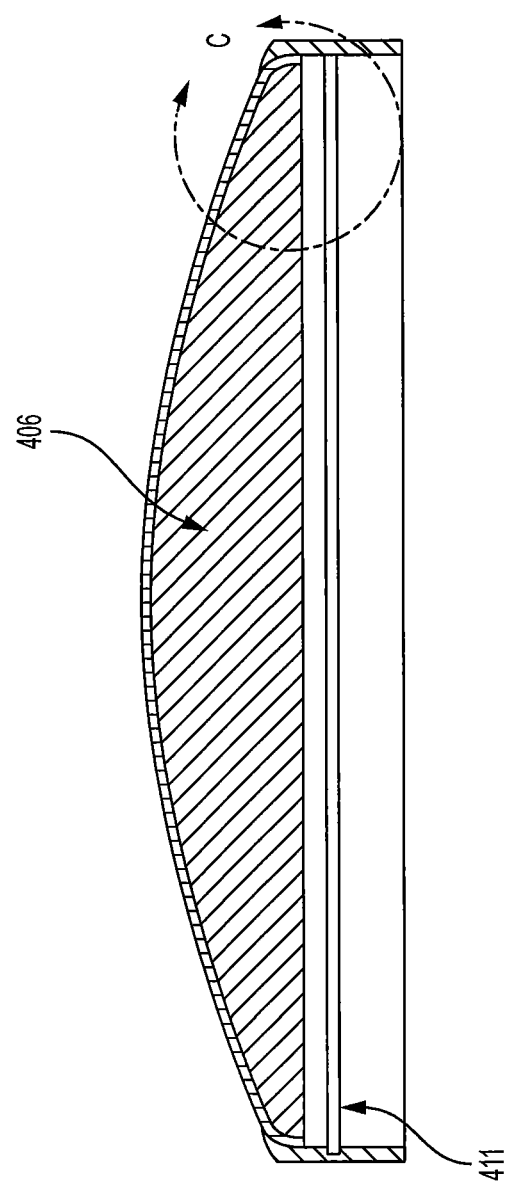
FIG. 4C is a cross-sectional view of the PMMW imaging device.
Figure 4D:
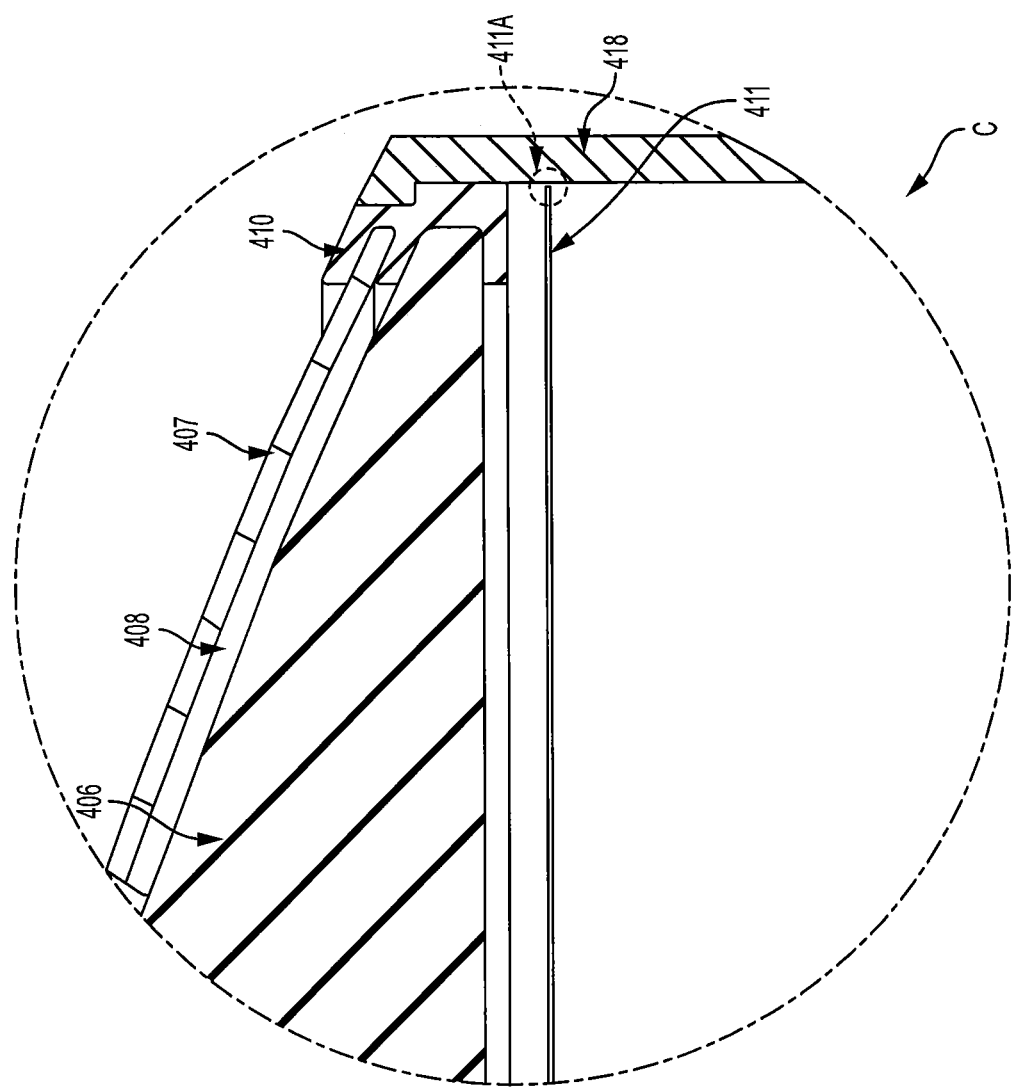
FIG. 4D is an enlarged view of FIG. 4C.

FIG. 4C is a cross-sectional view taken along an outer surface (e.g., an outer/protective lens 407) of the PMMW imaging device 30. Moreover, FIG. 4D is an enlarged view of the FIG. 4C. In particular, FIG. 4D is an enlarged view of a region C of the PMMW imaging device 30.

FIG. 4D illustrates a location 411A where the EMI filter 411 attaches to the housing 418. FIG. 4D also illustrates a gasket 410 that attaches both the main lens 406 and the protective lens 407 to the housing 418. Moreover, FIG. 4D illustrates an air gap 408 between the main lens 406 and the protective lens 407. As illustrated by FIG. 4D, the main lens 406 may be thicker than the protective lens 407. For example, the protective lens 407 may be closer in thickness to the gap 408 than to the main lens 406.

One challenging aspect of operating a PMMW imaging device over a wide temperature range is to account for Coefficient of Thermal Expansion (CTE) properties of materials. For example, the main lens 406 used to focus the RF energy 409 on the FPA 415 is typically made of some type of plastic material, such as Polyethylene, Rexolite, or TPX. These materials exhibit a large CTE. The size of the lens 406 contracts and expands by a significant amount as the temperature varies by as much as 120 degrees C. as seen in the example of an aircraft 10 having a radome area 12. If the main lens 406 is rigidly mounted to the imaging device 30's housing 418, the plastic lens 406 will deform or break. The use of other lens material(s) with a lower CTE, such as Quartz or glass, is very expensive and has high loss at MMW frequencies.

In the present invention, the issue of thermal expansion is dealt with in three different ways. First, the main lens 406 is mounted to the housing 418 with a flexible gasket 410 made of elastomeric material that allows the lens to expand and contract without experiencing any structural strain. Second, heating element(s) 419 installed inside the imaging device 30 may be used to reduce the temperature variation inside the housing 418. Third, a thin protective lens 407 (e.g., a "contact lens") may be added in front of the main lens 406 to provide some temperature insulation. The contact lens 407 is made of low-loss material such as Quartz material, which has a low CTE. The contact lens 407, along with a small air gap 408 between it and the main lens 406 may provide sufficient protection from the outside temperature to inhibit/prevent main lens 406 deformation or damage.

The heating element(s) 419 may be commercially-available heating elements. The heating element(s) 419, with the aid of a thermostat 419T (FIG. 9), may be configured to maintain a temperature inside the camera 30 at 0 to 5 degrees C., even when the outside temperature is as low as −55 degrees C. In some embodiments, each heating element 419 is configured to automatically power-on in response to detecting that an ambient temperature inside the millimeter wave imaging device 30 is below a threshold temperature, thus providing temperature protection/stability when the imaging device 30 targets a runway. For example, the threshold temperature may be a predetermined threshold temperature value such as 5 degrees C. or 1 degree C. In some embodiments, the thermostat 419T may detect that the ambient temperature is below the threshold. Moreover, the heater 419 and the thermostat 419T may include one or more controllers/processors that are configured to detect and respond to the ambient temperature.

In addition to, or as an alternative to, automatically powering-on the heating element(s) 419, the camera functionality of the millimeter wave imaging device 30 may be configured to automatically power-on in response to deployment of landing gear of an aircraft 10 that includes the millimeter wave imaging device 30. For example, the power supply 914 and/or the processor board 416 may be configured to automatically power-on the camera functionality (e.g., the FPA 415) in response to deployment of landing gear.

The gasket 410 is configured to allow both the main lens 406 and the contact lens 407 to expand and contract. The air gap 408 between the main lens 406 and the contact lens 407 provides thermal insulation. Although the contact lens 407 will be exposed to the outside temperature, the contact lens 407 and the air gap 408 provide some insulation to the main lens 406, which is inside the camera 30 and will not be exposed to temperatures below 0 degrees C. Therefore, the contraction and expansion of the main lens 406 may be much less than that of the contact lens 407.

The gasket 410 may be custom-designed for the camera 30, to hold the two lenses (the main lens 406 and the contact lens 407) without requiring fasteners. The elastomeric material composition of the gasket 410 is formulated to remain elastic over a wide range of temperatures. The gasket 410 may be molded specifically to fit the exact opening of the camera 30 and the lenses 406, 407.

PMMW sensors have not been used extensively in commercial aviation mostly because of the size, weight, and cost of such devices. For example, a PMMW device operating at 100 GHz, will have a 3 mm wavelength. This large wavelength makes everything in the sensor large, including the lens, the focal length, and the receiver pixels. The optics of the present invention, on the other hand, provide a system for reducing the size of an imaging device 30 through the unique optics described herein.

The optics of the PMMW imaging device 30 of the present invention are reduced in size by using a unique polarization splitter 412 that reflects one polarization, for example horizontal, and passes through the opposite polarization (vertical) with no/little loss. This characteristic, along with the use of a unique polarization rotator 413 enables folding of the RF optics, resulting in reduced imaging device 30 size by at least a factor of 2. For example, the PMMW imaging device 30 may be approximately 1 cubic foot in size.

Figure 5:
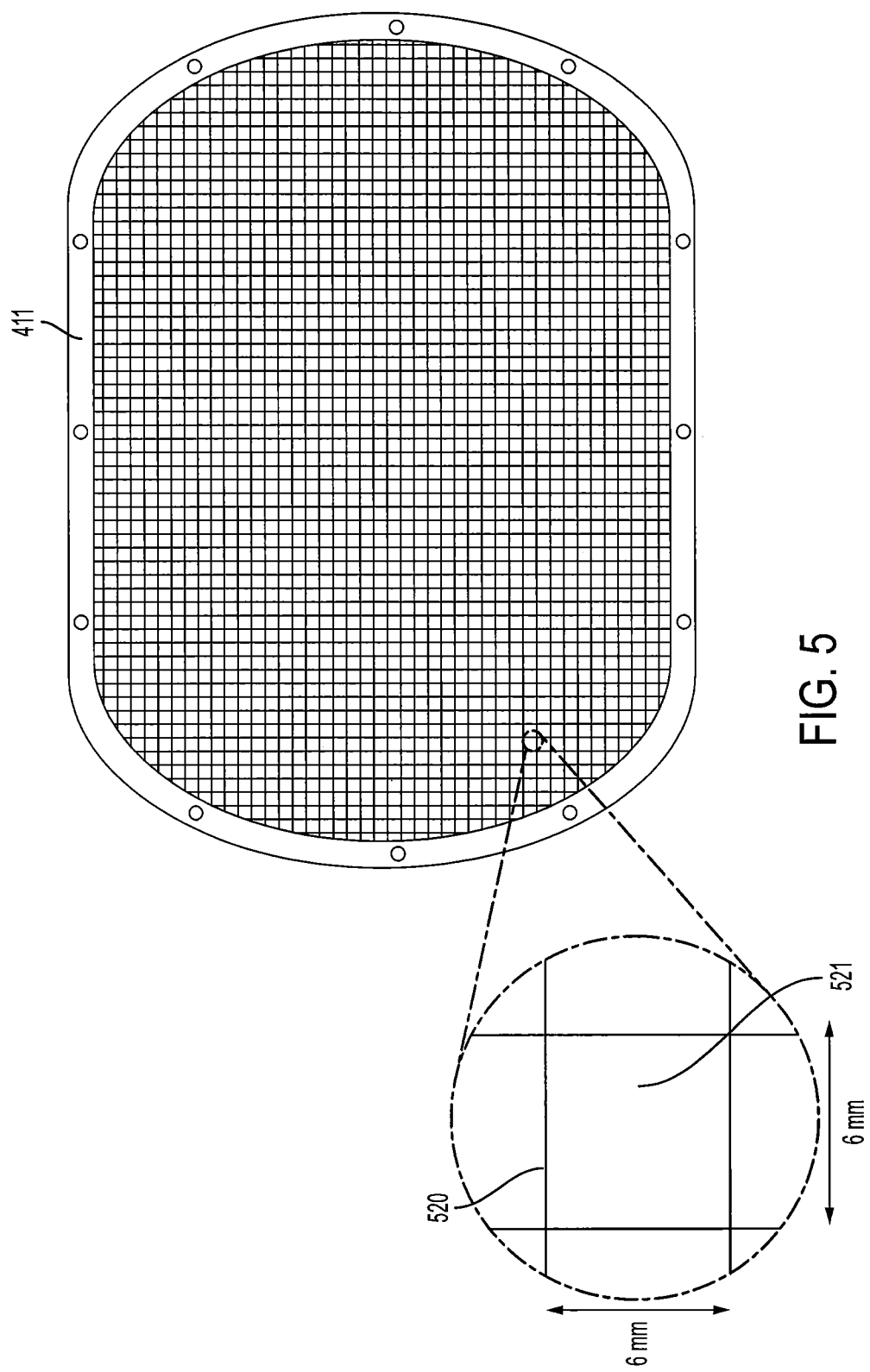
FIG. 5 is a top view of an EMI filter according to the present invention.

FIG. 5 illustrates the EMI filter 411 of the present invention. The EMI filter 411 rejects low frequencies with a high level of attenuation and passes the MMW frequencies with no/little loss. The EMI filter 411 may be made of etched lines 520 on a low-loss dielectric material 521.

One challenging aspect of operating a PMMW imaging device 30 in the presence of other sensors, such as in the radome area 12 of an aircraft 10, is interference from other sources of RF energy. This interference comes from radar and communications equipment in the vicinity of the PMMW imaging device 30. Although most of these other sensors operate at much lower frequencies than the PMMW device 30, the high energy level emitted by these other sensors can be many (e.g., billions of) times larger than the energy being detected by the PMMW device 30. Therefore, it is important to filter these signals. The main area of penetration of these interfering signals is the main lens 406. This is why the EMI filter 411 is installed closely behind the main lens 406.

Figure 6:
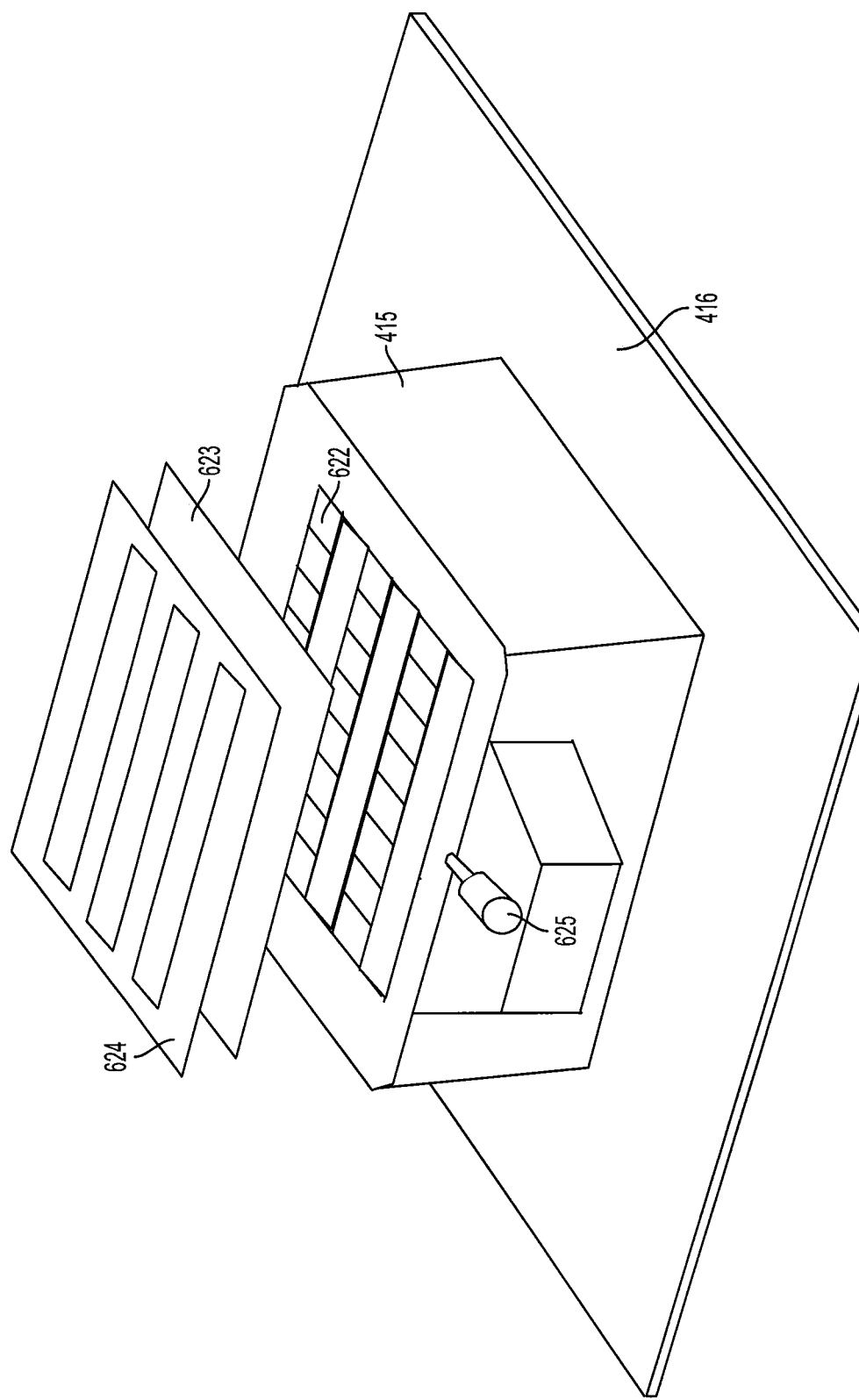
FIG. 6 is a perspective view of an FPA according to the present invention.

FIG. 6 illustrates an isometric/perspective view of an FPA 415 that is mounted on a digital signal processor board 416. The receiver pixels 622 of the FPA 415 are protected by a low-loss RF cover 623. On top of this cover 623 is a sliding shutter 624, which is moved by an actuator 625. The sliding shutter 624 function will be discussed in greater detail later herein.

Figure 7:
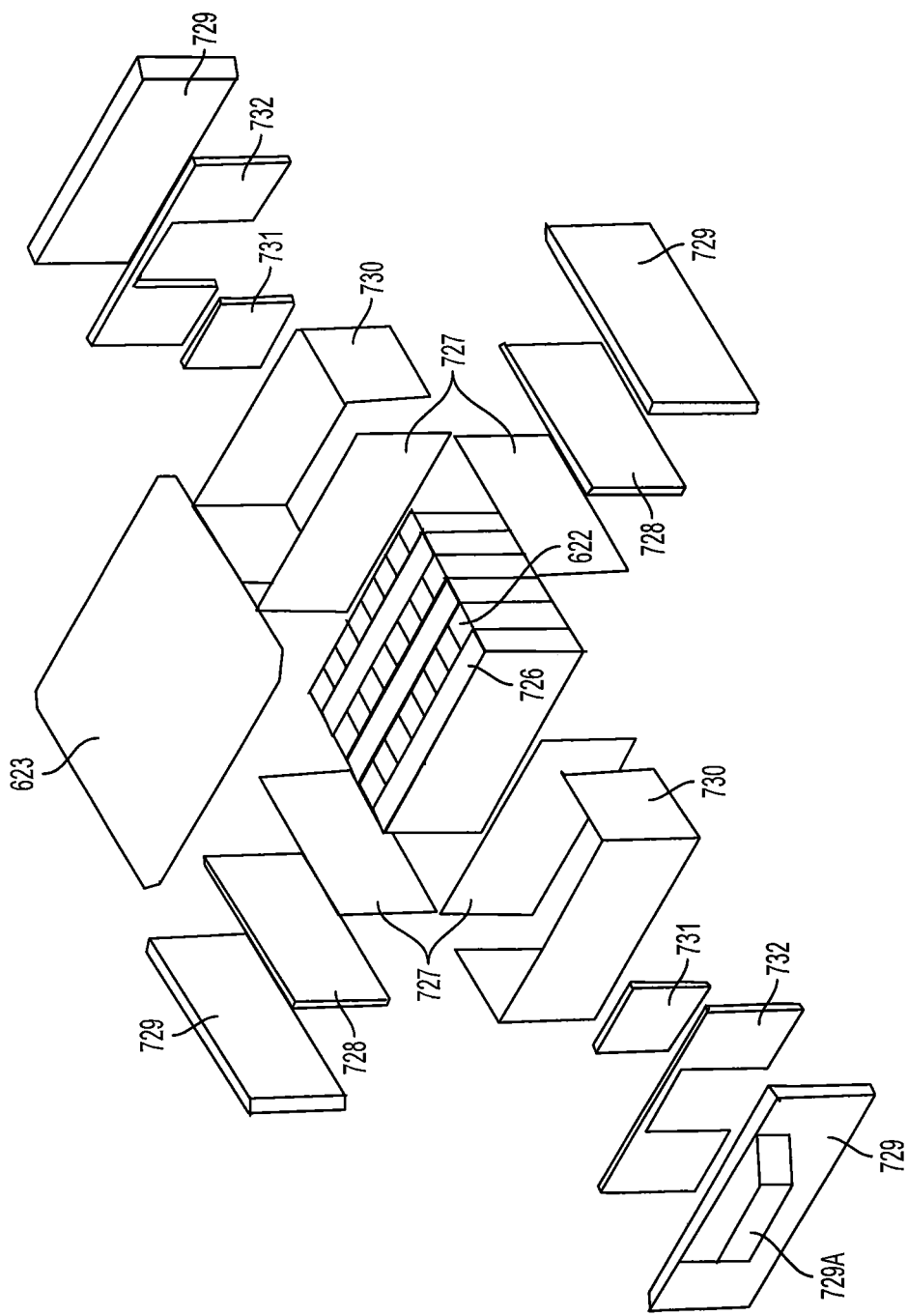
FIG. 7 is an exploded view of the FPA according to the present invention.

FIG. 7 illustrates an exploded view of an FPA 415. At the center of the FPA 415 are receiver pixels 622, which capture RF energy 409, amplify it, and detect its level. The pixels 622 are separated by aluminum spacers 726, which provide heat sinking to the pixels 622. The pixels 622 are surrounded by flexible silicon material 727, which allows compression of the FPA 415 housing without damaging the pixels 622. The next layer around the pixels 622 is formed by using copper (or other metal) heat spreaders 730. The spreaders 730 are used to spread heat evenly around the pixels 622. After the copper spreaders 730, two insulator layers 728 are used on two sides of the FPA 415, and two TEC modules 731 are used on the other two sides. The TEC modules 731 are used for cooling or heating the FPA 415. The temperature of the TEC modules 731 is controlled by the processor board 416 of the FPA 415. In some embodiments, the processor board 416 may be referred to herein as a "processor," which may be any type of microprocessor. The TEC modules 731 are surrounded by insulating material 732 (which may be referred to herein as an "insulation layer") of the same thickness as the TEC modules 731. The outer housing of the FPA 415 is made up of aluminum plates 729 that are assembled by fasteners (not shown). On one of the aluminum housing plates 729, a pedestal 729A is used to mount an actuator 625 (FIG. 6), which will be discussed in greater detail later herein. This unique construction of the FPA 415 provides an excellent way to control the FPA 415 temperature so that the temperature of the pixels 622 remains stable during imaging.

As previously discussed, a challenging aspect of creating good radiometric images using a PMMW device may be that the sensor internal receiver noise is many times larger than the signal of the target being imaged. One way to overcome this challenge is to integrate the target signal (noise) over long periods of time. This may not be very practical, however, especially when the imaging device is moving, such as in the case where the sensor is mounted on a moving aircraft 10. A different way is to use a known RF reference source inside the sensor to continually calibrate the receiver while collecting image data. This is the well-known Dicke radiometer. This technique is widely used, but it results in degraded sensitivity, as much of the time is spent looking at the reference source. This may reduce the PMMW imaging device sensitivity. A third method is to control the sensor environment so precisely that the receiver(s) do not fluctuate as a function of changes in the ambient temperature. This method has been tried by immersing the receiver in very cold liquids (such as liquid nitrogen) to keep it from drifting. But this may not be a viable solution for a small PMMW imaging device that can be used in the nose 12 of an aircraft 10.

The present invention implements a unique way of maintaining the receiver temperature constant during the imaging process. The FPA 415 is carefully packaged to create very stable environment for the receiver pixels 622. In addition to the special packaging, the FPA 415 uses active TEC modules 731 that can cool or heat the receiver pixels 622 to maintain the temperature of the FPA 415 within +/−0.1 degrees accuracy during the imaging period. The TEC modules 731 are not necessarily used to heat or cool the FPA 415 to a given temperature (e.g., a temperature greater than the ambient temperature), but rather to maintain a stable temperature that is close to the ambient temperature while the sensor is imaging. If the ambient temperature changes, the TEC modules 731 can move the set point to the new ambient temperature. This technique allows the sensor to be stable when imaging a scene, without using an excessive amount of power to cool or heat the FPA 415.

One challenging aspect of using a multi-receiver PMMW imaging device is calibration of the pixels 622 relative to each other to create uniform images. Unfortunately, it may be difficult to make receiver pixels 622 behave exactly the same way. Each receiver pixel 622 has a unique gain, sensitivity, and temperature drift.

Figure 8B:
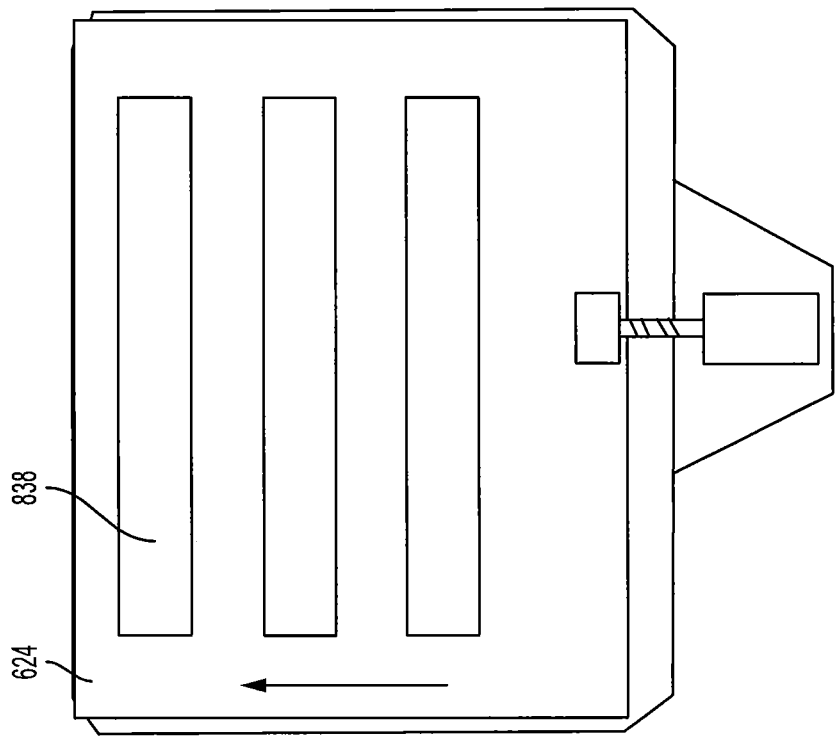
FIGS. 8A and 8B are top views of a calibration system according to the present invention.
Figure 8A:
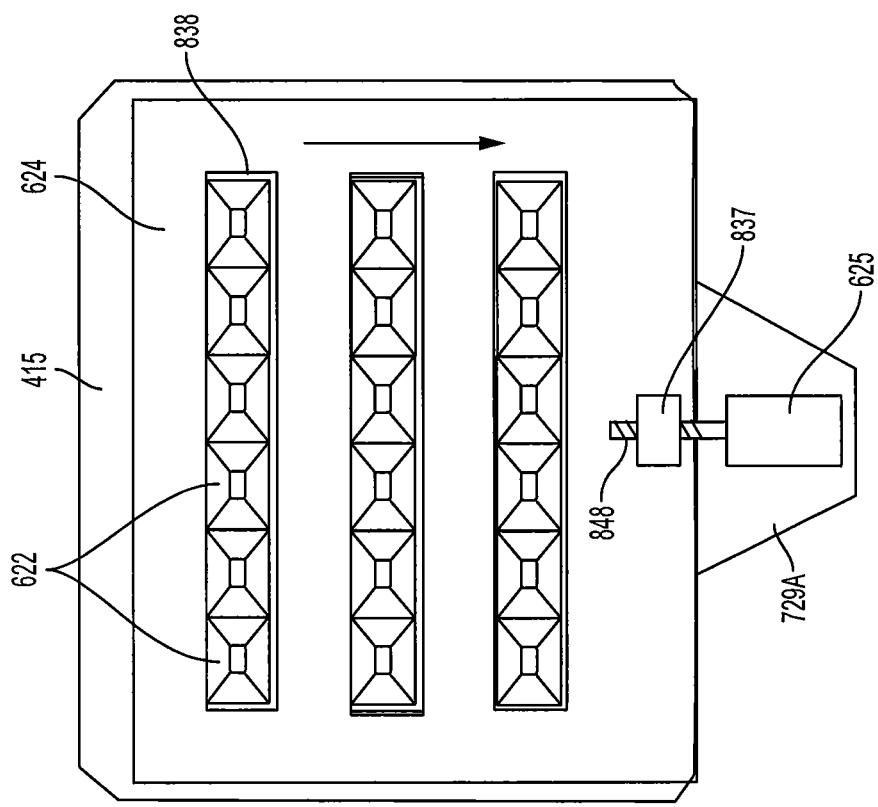

FIGS. 8A and 8B illustrate an isometric view of an FPA 415 calibration method. A shutter plate 624 is mounted on top of the pixels 622. The shutter 624 has openings 838 that are matched to the size of the pixels 622. An actuator 625, mounted on pedestal 729A, has a threaded shaft 848 that is used to slide the shutter plate 624 over pixel 622 openings, by using a threaded nut 837 mounted on the plate 624. In FIG. 8A, the openings 838 of the shutter plate 624 are lined-up with the pixels 622 and therefore the RF Energy 409 is captured by the pixels 622. In FIG. 8B, the shutter plate 624 is moved and the pixels 622 are now covered. When the pixels 622 are covered, the sensor can then perform calibration. The shutter plate 624 provides a uniform target for all the pixels 622 and therefore accurate calibration can be performed.

PMMW radiometer sensors may rely on some type of periodic calibration to deal with receiver drift. Moreover, in the present invention, the calibration target is implemented as part of a shutter 624 that opens and closes to block or let the RF energy 409 come in the receiver. The unique arrangement of the receiver pixels 622, along with the location of the calibration target, which may be the shutter 624 itself, is unique. The shutter 624 is made of an absorbing material that presents a constant temperature for all the receiver pixels 622. The behavior of the receiver pixels 622 over temperature is characterized in the factory and the calibration data is stored in an EPROM device. Over time and temperature, the receiver pixels 622 will drift relative to each other. Closing the shutter 624 allows the on-board processor 416 to realign the pixels 622 relative to each other. This may be beneficial to the formation of images using multiple receiver pixels 622 in the FPA 415.

The term "arrangement," when used herein with respect to the receiver pixels 622, may refer to the spacing/distance between receiver pixels 622. The range of distances between receiver pixels may depend on pixel 622 orientation. In one dimension, the spacing may be about 0.5 inches (center to center). In the direction of the scan, the pixels 622 may be spaced apart based on optimum/desired scanning and image reconstruction. Optimum/desired spacing may depend on many factors, but may be based primarily on the Rayleigh limit=70$\lambda$/D, where $\lambda$ is the wavelength and D is the distance between the pixels 622.

The spacing of the pixels 622 allows the shutter 624 to move from one position where the pixels 622 are receiving energy 409 to the calibration position, where the pixels 622 are completely blocked by the shutter 624, so that calibration can be performed. The spacing of the pixels 622 may be designed to match the scanning method that is used to create the image. This spacing, along with the image reconstruction (stitching of the images from the individual position), may also determine the quality of the image that is generated.

Figure 9:
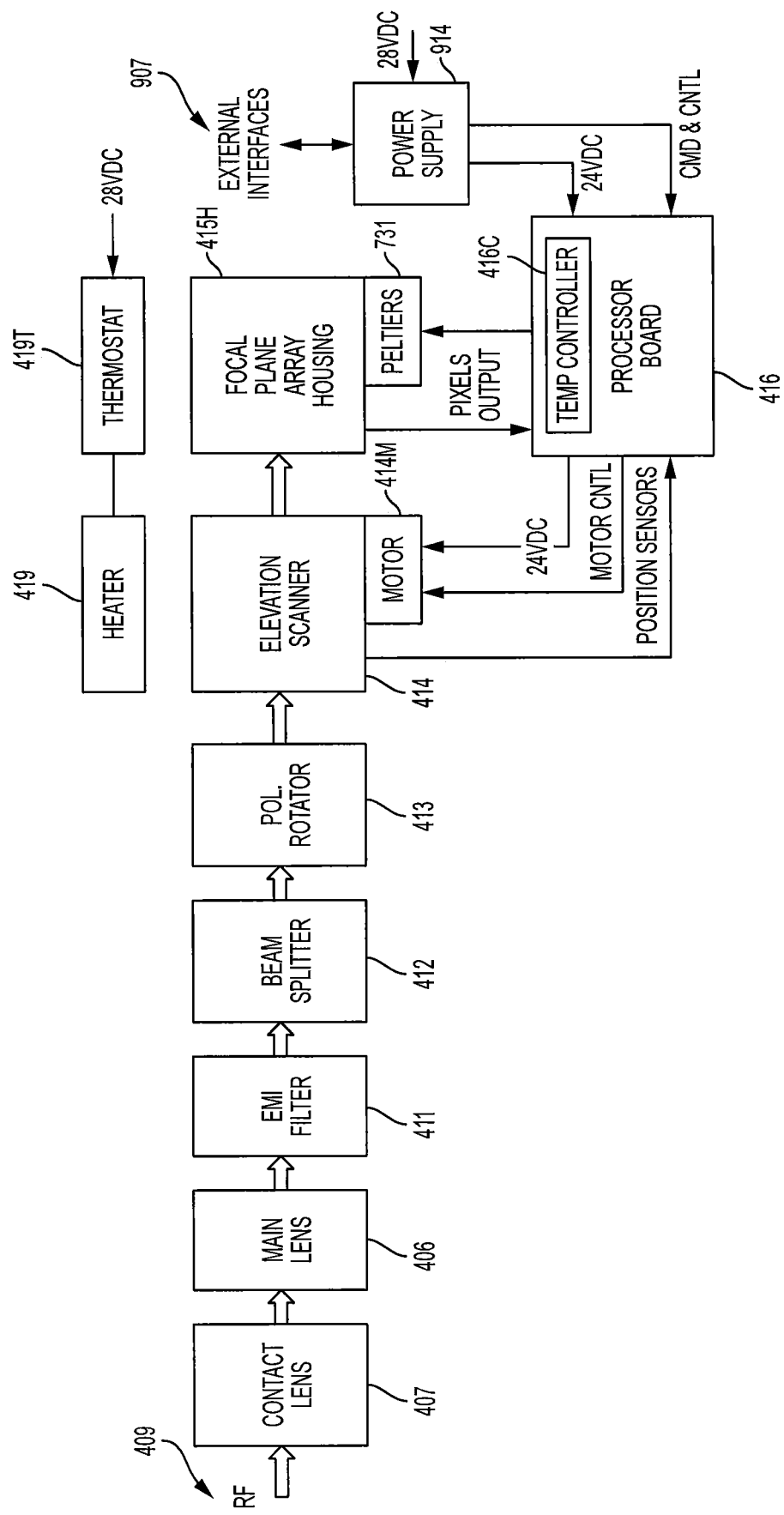
FIG. 9 is a block diagram of a PMMW imaging device according to the present invention.

FIG. 9 is a block diagram of a PMMW imaging device 30 according to the present invention. FIG. 9 illustrates elements of FIG. 4B, repeated descriptions of which may be omitted with respect to the discussion of FIG. 9 for the sake of brevity. FIG. 9 further illustrates that the elevation scanner 414 may be coupled to a motor 414M, that the FPA 415 may include a housing 415H, and that the processor board 416 may include temperature controller circuitry 416C that is coupled to one or more TEC modules 731.

Moreover, FIG. 9 illustrates a power supply 914 that is coupled to the processor board 416, and external interfaces 907 that are connected to the power supply 914. FIG. 9 also illustrates various example inputs and outputs, including 24 and 28 Volts DC inputs, position sensor outputs, outputs from the array of pixels 622, and motor control (Motor Cntl) and command and control (CMD & CNTL) inputs. Furthermore, FIG. 9 illustrates that the TEC modules 731 may be Peltier modules/circuits. It will be understood, however, that various types of temperature regulators may be used.

FIGS. 10A-10D are flowcharts of operations of a PMMW imaging device 30' according to the present invention. It will be understood that one or more processors, including the processor 416, may be configured to perform the operations of any block of FIGS. 10A-10D.

Figure 10A:
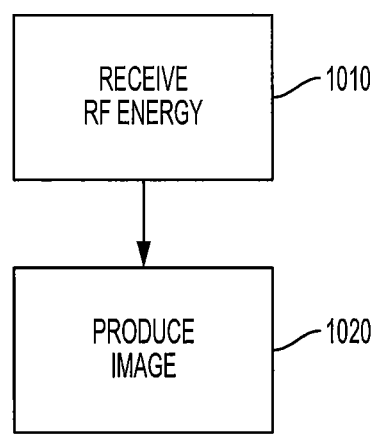
FIGS. 10A-10D are flowcharts of operations of a PMMW imaging device according to the present invention.

Referring to FIG. 10A, the operations may include receiving (Block 1010) RF energy 409 and producing (Block 1020) an image based on the RF energy 409. The receiving in Block 1010 may refer to receiving the RF energy 409 via, for example, the main lens 406, the protective lens 407, and the EMI filter 411. Moreover, the image production in Block 1020 may refer to using the processor board 416 to digitize RF signals that pass through the EMI filter 411 and to produce an image of a target that the PMMW imaging device 30 is facing. The image may be provided for display on a display screen, such as a display screen in a cockpit of an aircraft 10.

Figure 10B:
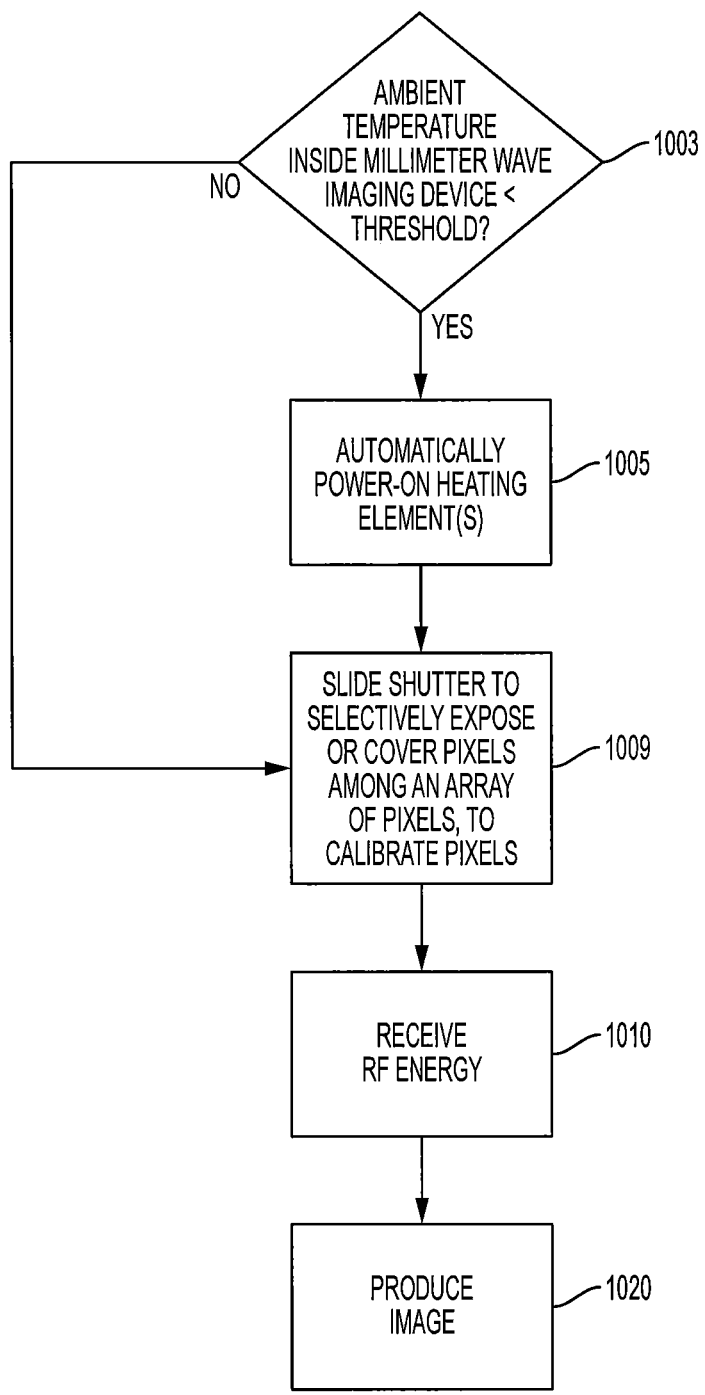

Referring to FIG. 10B, operations of receiving (Block 1010) may be preceded by automatically powering-on (Block 1005) one or more heating elements 419 inside the outer housing 418 of the PMMW imaging device 30, in response to detecting (Block 1003) an ambient temperature inside the outer housing 418 that is below a threshold temperature. Moreover, pixels 622 of the FPA 415 may be calibrated by sliding (Block 1009) a shutter 624 that is on the FPA 415, to selectively expose or cover a group of pixels 622, among an array of pixels 622, of the FPA 415.

Although Blocks 1003, 1005, and 1009 are illustrated as preceding the operations of receiving (Block 1010), it will be understood that one or more of the Blocks 1003, 1005, and 1009 could occur in parallel with the operations of receiving (Block 1010), or after the operations of receiving (Block 1010). For example, the heating element(s) 419 could be automatically powered-on (Block 1005) concurrently with receiving (Block 1010) the RF energy 409. Moreover, the calibration of Block 1009 could be performed before automatically powering-on (Block 1005) the heating element(s) 419, or after producing (Block 1020) the image (e.g., to recalibrate after the image).

Figure 10C:
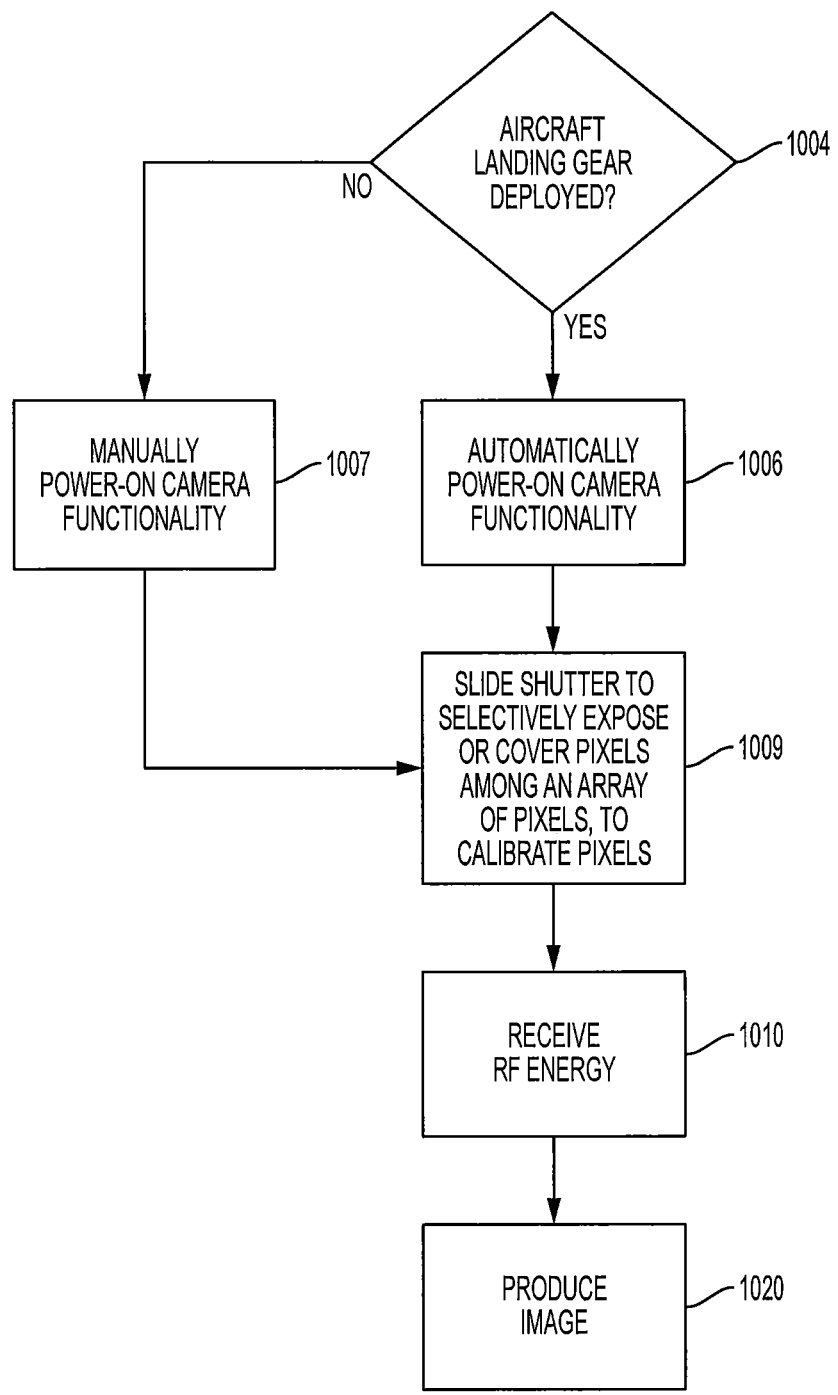

Referring to FIG. 10C, operations of the PMMW imaging device 30 may include automatically powering-on (Block 1006) camera functionality of the PMMW imaging device 30, in response to deployment (Block 1004) of landing gear of an aircraft 10 that includes the PMMW imaging device 30. Additionally or alternatively, the camera functionality may be powered-on (Block 1007) manually. For example, the camera functionality may be manually powered-on (Block 1007) by a pilot of the aircraft 10 either before or after deployment (Block 1004) of landing gear.

Figure 10D:
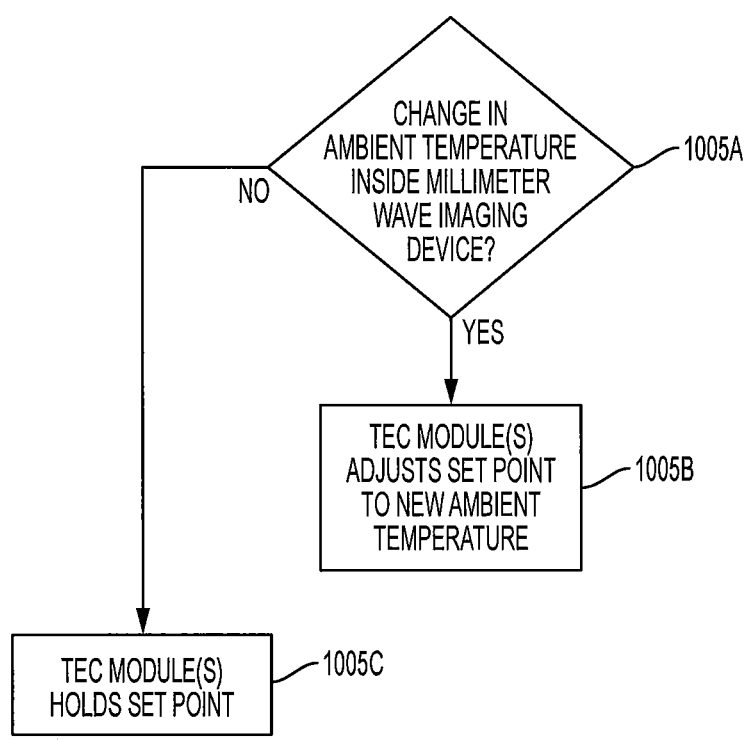

Referring to FIG. 10D, additional operations following Block 1005 of FIG. 10B are illustrated. These additional operations include adjusting (Block 1005B) a set point (set temperature) of one or more TEC modules 731, in response to detecting (Block 1005A) a change in ambient temperature inside the outer housing 418 of the PMMW imaging device 30. If, on the other hand, no change is detected in Block 1005A, then the one or more TEC modules 731 hold (Block 1005C) their set point. Accordingly, the PMMW imaging device 30 may operate the TEC module(s) 731 at a first (e.g., initial) set point based on the ambient temperature, and then may adjust (Block 1005B) the first set point to a second set point, in response to detecting (Block 1005A) a change in the ambient temperature. Although this example uses TEC module(s) 731, it will be understood that one or more of various types of temperature regulators/controllers may be used to maintain a stable temperature inside the housing 418 for the pixels 622.

The following are among the advantages provided by the present invention:
1) The use of a protective lens 407, flexible lens mounts 410, and heating elements 419 to enable a camera 30 to operate in a wide range of temperatures without distorting the main lens 406.
2) The use of the EMI filter 411 to attenuate low-frequency signals and allow the sensor to operate in a high EMI environment.
3) The use of a polarization splitter 412 and polarization rotator 413 to fold the focal point length and enable the creation of a compact PMMW imaging device 30 that can fit in small spaces such as the radome area 12 of an aircraft 10.
4) The focal plane array housing 415H (FIG. 9) construction may include a intricate mix of heat spreaders 730, insulators 728/732, and active TEC modules 731 to maintain an extremely stable pixel 622 temperature during imaging. This may be very helpful for making good radiometric images.
5) Use of a sensor shutter 624 to perform calibration. This may eliminate the need to use active calibration targets or a reference voltage.

Although the device 30 may be referred to herein as "a PMMW imaging device," "a compact PMMW imaging device," "a millimeter wave camera," or a "sensor," it will be understood that the device 30 may be any type of millimeter wave imaging device.

In the figures, certain components or features may be exaggerated for clarity. In addition, the sequence of operations (or steps) is not limited to the order presented in the figures and/or claims unless specifically indicated otherwise. Features described with respect to one figure or embodiment can be associated with another embodiment or figure although not specifically described or shown as such.

It will be understood that when an element is referred to as being "coupled" or "connected" to another element, it can be directly coupled or connected to the other element or intervening elements may also be present. In contrast, when an element is referred to as being "directly coupled" or "directly connected" to another element, no intervening elements are present. Like numbers refer to like elements throughout.

In addition, spatially relative terms, such as "under," "below," "lower," "over," "upper," and the like, may be used herein for ease of description to describe one element's or feature's relationship to another element(s) or feature(s) as illustrated in the figures. It will be understood that the spatially-relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the example term "under" can encompass both an orientation of over and under. The device may be otherwise oriented (rotated 90 degrees or at other orientations) and the spatially-relative descriptors used herein interpreted accordingly.

The terminology used herein is for the purpose of describing particular embodiments only, and is not intended to be limiting of the invention. As used herein, the singular forms "a," "an," and "the" are intended to include the plural forms as well, unless the context clearly indicates otherwise. As used herein, the terms "comprise," "comprising," "comprises," "include," "including," "includes," "have," "has," "having," or variants thereof are open-ended, and include one or more stated features, elements, steps, components, or functions, but do not preclude the presence or addition of one or more other features, elements, steps, components, functions, or groups thereof.

As used herein, the term "and/or" (which may be abbreviated as "/") includes any and all combinations of one or more of the associated listed items.

It will be understood that although the terms "first" and "second" are used herein to describe various features or elements, these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the present invention.

The term "about," as used herein with respect to a value or number, means that the value or number can vary by +/−twenty percent (20%).

Unless otherwise defined, all terms (including technical and scientific terms) used herein have the same meaning as commonly understood by one of ordinary skill in the art to which this invention belongs. It will be further understood that terms, such as those defined in commonly-used dictionaries, should be interpreted as having a meaning that is consistent with their meaning in the context of the specification and relevant art and should not be interpreted in an idealized or overly-formal sense unless expressly so defined herein. Well-known functions or constructions may not be described in detail, for brevity and/or clarity.

The foregoing is illustrative of the present invention and is not to be construed as limiting thereof. Although a few example embodiments of this invention have been described, those skilled in the art will readily appreciate that many modifications are possible in the example embodiments without materially departing from the teachings and advantages of this invention. Accordingly, all such modifications are intended to be included within the scope of this invention as defined in the claims. The invention is defined by the following claims, with equivalents of the claims to be included therein.

What is claimed is:

1. A millimeter wave imaging device comprising:
   a housing;
   one or more heating elements inside the housing;
   a flexible gasket on the housing;
   a main lens attached to the housing by the flexible gasket;
   a protective lens on an outer surface of the main lens; and
   an Electromagnetic Impulse (EMI) filter attached to the housing and extending along an inner surface of the main lens, wherein the EMI filter is configured to pass millimeter wave frequencies of Radiofrequency (RF) energy collected by the main lens while rejecting signals with frequencies that are lower than the millimeter wave frequencies.

2. The millimeter wave imaging device of claim 1,
   wherein the housing comprises a main outer housing of the millimeter wave imaging device, and
   wherein the protective lens is attached to the main outer housing by the flexible gasket.

3. The millimeter wave imaging device of claim 2, wherein the protective lens is spaced apart from the outer surface of the main lens by an air gap.

4. The millimeter wave imaging device of claim 1, wherein the flexible gasket comprises an elastomeric gasket that attaches the main lens and the protective lens to the housing.

5. The millimeter wave imaging device of claim 1, wherein the main lens is thicker than the protective lens.

6. The millimeter wave imaging device of claim 1, further comprising:
a motorized scanner;
a polarization rotator on the motorized scanner; and
a polarization splitter configured to reflect, to the polarization rotator, millimeter wave energy of the RF energy collected by the main lens.

7. The millimeter wave imaging device of claim 6, further comprising a Focal Plane Array (FPA) configured to receive, from the polarization rotator, energy of the millimeter wave frequencies that comprises a rotated polarization.

8. The millimeter wave imaging device of claim 1, further comprising a Focal Plane Array (FPA) configured to receive the millimeter wave frequencies that are collected by the main lens.

9. The millimeter wave imaging device of claim 8, wherein the FPA comprises:
an array of pixels; and
one or more temperature regulators coupled to the array of pixels.

10. The millimeter wave imaging device of claim 9, wherein the one or more temperature regulators comprises one or more Thermoelectric Cooler (TEC) modules configured to cool and/or heat the FPA, and
wherein the FPA further comprises:
a flexible material adjacent the array of pixels;
a metal heat spreader on the flexible material; and
an insulation layer on the flexible material and/or on the metal heat spreader.

11. The millimeter wave imaging device of claim 9, further comprising a sensor calibration target on the array of pixels.

12. The millimeter wave imaging device of claim 11,
wherein the sensor calibration target comprises a shutter, and
wherein the millimeter wave imaging device further comprises an actuator that is configured to slide the shutter to selectively expose or cover pixels among the array of pixels.

13. The millimeter wave imaging device of claim 9, further comprising a metal spacer between adjacent rows of pixels in the array of pixels.

14. The millimeter wave imaging device of claim 1, wherein each of the one or more heating elements is configured to automatically power-on in response to detecting that an ambient temperature inside the millimeter wave imaging device is below a threshold temperature.

15. The millimeter wave imaging device of claim 1, wherein camera functionality of the millimeter wave imaging device is configured to automatically power-on in response to deployment of landing gear of an aircraft comprising the millimeter wave imaging device.

16. A millimeter wave camera comprising:
an outer housing;
one or more heating elements inside the outer housing;
a flexible gasket on the outer housing;
a main lens attached to the outer housing by the flexible gasket;
a protective lens overlapping an outer surface of the main lens and attached to the outer housing by the flexible gasket;
an Electromagnetic Impulse (EMI) filter extending along an inner surface of the main lens, wherein the EMI filter is configured to pass millimeter wave frequencies of Radiofrequency (RF) energy collected by the main lens;
a motorized scanner;
a polarization rotator on the motorized scanner;
a polarization splitter configured to reflect, to the polarization rotator, the millimeter wave frequencies that are collected by the main lens; and
a Focal Plane Array (FPA) configured to receive, from the polarization rotator, energy of the millimeter wave frequencies that comprises a rotated polarization.

17. The millimeter wave camera of claim 16,
wherein the FPA comprises a temperature regulator that is configured to cool and/or heat the FPA, and
wherein the protective lens is spaced apart from the outer surface of the main lens by an air gap.

18. A millimeter wave camera comprising:
an outer housing;
one or more heating elements inside the outer housing;
a flexible gasket on the outer housing;
a main lens attached to the outer housing by the flexible gasket;
a protective lens attached to the outer housing by the flexible gasket and spaced apart from an outer surface of the main lens by an air gap;
an Electromagnetic Impulse (EMI) filter extending along an inner surface of the main lens, wherein the EMI filter is configured to pass millimeter wave frequencies of Radiofrequency (RF) energy collected by the main lens;
a polarization rotator;
a polarization splitter configured to reflect, to the polarization rotator, the millimeter wave frequencies that are collected by the main lens; and
a Focal Plane Array (FPA) configured to receive, from the polarization rotator, energy of the millimeter wave frequencies that comprises a rotated polarization, wherein the FPA comprises:
an array of pixels; and
a temperature regulator coupled to the array of pixels.

19. The millimeter wave camera of claim 18,
wherein each of the one or more heating elements is configured to automatically power-on in response to an ambient temperature inside the outer housing that is below a threshold temperature, and
wherein camera functionality of the millimeter wave camera is configured to automatically power-on in response to deployment of landing gear of an aircraft comprising the millimeter wave camera.

20. The millimeter wave camera of claim 18,
wherein the FPA further comprises:
a flexible material adjacent the array of pixels;
a metal heat spreader on the flexible material; and
an insulation layer on the flexible material and/or on the metal heat spreader,
wherein the millimeter wave camera further comprises a shutter on the array of pixels, and
wherein the shutter is configured to slide to selectively expose or cover pixels among the array of pixels.

21. A method of operating a millimeter wave imaging device, the method comprising:
automatically powering-on one or more heating elements inside an outer housing of the millimeter wave imaging device, in response to detecting an ambient temperature inside the outer housing that is below a threshold temperature;

sliding a shutter that is on a Focal Plane Array (FPA) inside the outer housing, to selectively expose or cover a group of pixels that is among an array of pixels of the FPA;

receiving Radiofrequency (RF) energy at the millimeter wave imaging device via components of the millimeter wave imaging device comprising:
- a main lens attached to the outer housing by a flexible gasket;
- a protective lens attached to the outer housing by the flexible gasket; and
- an Electromagnetic Impulse (EMI) filter extending along an inner surface of the main lens; and producing an image based on the RF energy.

22. The method of claim 21, further comprising automatically powering-on camera functionality of the millimeter wave imaging device, in response to deployment of landing gear of an aircraft comprising the millimeter wave imaging device.

23. The method of claim 21, further comprising:
operating one or more Thermoelectric Cooler (TEC) modules inside the millimeter wave imaging device at a first set point based on the ambient temperature; and
adjusting the first set point to a second set point of the one or more TEC modules, in response to detecting a change in the ambient temperature.

* * * * *